United States Patent [19]

Arweiler et al.

[11] Patent Number: 5,499,339
[45] Date of Patent: Mar. 12, 1996

[54] PROCESS FOR DETERMINING THE ORIGIN OF BIT ERRORS IN A DATA STREAM TRANSMITTED FROM A DATA SOURCE TO A DATA RECEIVER

[75] Inventors: Hans-Werner Arweiler; Andreas Wolf, both of Berlin, Germany

[73] Assignee: Siemens Aktiengesellschaft, Munich, Germany

[21] Appl. No.: 167,980
[22] PCT Filed: May 12, 1992
[86] PCT No.: PCT/DE92/00395
   § 371 Date: May 16, 1994
   § 102(e) Date: May 16, 1994
[87] PCT Pub. No.: WO93/00760
   PCT Pub. Date: Jan. 7, 1993

[30] Foreign Application Priority Data

Jun. 26, 1991 [DE] Germany ............................ 41 21 478.1

[51] Int. Cl.[6] .............................. H04L 12/26; H04L 25/00
[52] U.S. Cl. .................... 395/183.19; 395/183.08
[58] Field of Search ...................... 371/29.5; 395/183.19, 395/183.08

[56] References Cited

FOREIGN PATENT DOCUMENTS 094902 11/1983 European Pat. Off. .

OTHER PUBLICATIONS

Sterns, Digital Signal Analysis, 1975, at 22–34 and 232–239.
den Brinker, Calculation of the Local Cross–Correlation Function on the Basis of the Laguerre Transform, IEEE Trans. on Signal Processing, May 1993, at 1980.
Ersory, A Comparative Review of Real and Complex Fourier–Related Transforms, Proceedings of the IEEE, Mar. 1994, at 429.

*Primary Examiner*—Robert W. Beausoliel, Jr.
*Assistant Examiner*—Alan M. Fisch
*Attorney, Agent, or Firm*—Kenyon & Kenyon

[57] ABSTRACT

A flow of data (DS) from a data source (1) passes to a data receiver (9) via an intermediate path (5) and a transmission path (7). Before entering the transmission path (7) the flow of data (DS) is scrambled in a predetermined manner and unscrambled in the same manner on leaving the transmission path (7). A bit error function e(n) is obtained from test data (TZ) inserted into the flow of data (DS) at the data source and evaluated according to its period length (N). A bit error (BF) occurring before scrambling goes unmultiplied to the data receiver after unscrambling, whereas a bit error (BF) occurring on the transmission path (7) is multiplied by a period length ($N_v$) specific to the descrambling. A comparison of this period length ($N_v$) with the period length (N) of the bit error function (e(n)) makes it possible to locate the origin.

22 Claims, 5 Drawing Sheets

PROCESS FOR DETERMINING THE ORIGIN OF BIT ERRORS IN A DATA STREAM TRANSMITTED FROM A DATA SOURCE TO A DATA RECEIVER

BACKGROUND OF THE INVENTION

In modern communication technology, digital data form a data stream which is to be fed by a data source to a data receiver. This data stream is generally fed via electrical or optical lines. When transmitted through these lines, the data stream is exposed to external interference effects. These interference effects can corrupt the individual data (bits) in the data stream stochastically or deterministically. As a result, the received data stream is encumbered with corresponding stochastic or deterministic bit errors.

Modern transmission systems often have an intermediate path, by which the data stream, coming from a data source, is supplied to a transmission path. For data protection, before entering into the transmission path, the data stream is scrambled in a scrambler following the intermediate path in accordance with a specified instruction by a known period length and, after emerging from the transmission path, descrambled by a descrambler in accordance with the specified instruction. Moreover, the successive occurrence of a plurality of direct data is thus avoided in the data stream. Such a successive occurrence would otherwise result in the data stream to be transmitted having a large same component. It would also be reflected in the transmission quality when system components (such as amplifiers) are used in the line for transmitting data, due to their relatively unfavorable transmission performance characteristics for same components.

In principle, the way the scrambling, or rather descrambling, operations are carried out is that bit errors occurring after the scrambling operation are multiplied by a previously known period length, and the bit errors occurring before the scrambling operation are contained as unmultiplied bit errors in the descrambled data stream that emerges from the transmission path.

The European Patent, EP-A2-0 094 902 discloses a method for localizing the origin of bit errors in a data stream, which, coming from a data stream, arrives via a transmission path consisting of a plurality of path sections at a data receiver. Each path section is delimited on the input side by a scrambler and, on the output side, by a descrambler. The scrambler and descrambler of a path section each have circuit elements (scrambling instructions) specific to a path section, so that bit errors occurring in one path section undergo a descrambler-specific multiplication. Deviations established from a comparison of transmitted test data to received test data are registered and, in some instances, automatically evaluated in a manner that is not described in greater detail. A relatively high level of complexity is required to evaluate the various descrambler-specific bit-error patterns. The European Patent, EP-A2-0 094 902 does not mention locating errors in an intermediate path, through which the data stream arrives in a state in which it has not been scrambled.

Thus, there exists a need to devise a process for determining the origin of bit errors in a data stream, which arrives in a state in which it has not been scrambled via at least one intermediate path and, in a scrambled state, arrives via at least one transmission path at a data receiver, the process being distinguished by a low level of complexity for implementation and evaluation and which, nevertheless, permits the origin of bit errors to be determined accurately and simply.

SUMMARY OF THE INVENTION

This objective is solved according to the present invention by a process for determining the origin of bit errors in a data stream, which, coming from a data source, arrives via at least one intermediate path and at least one transmission path at a data receiver. Before entering into the transmission path, the data stream is scrambled in accordance with a specified instruction with a predetermined period length. After emerging from the transmission path, the data stream is descrambled in accordance with a corresponding instruction. In this way, bit errors occurring after the scrambling operation are multiplied by the predetermined period length, and bit errors occurring before the scrambling operation are contained as unmultiplied bit errors in the descrambled data stream. Test data are sent with the data stream on the side of the data source, and a bit-error function is derived from the received test data by evaluating bit errors contained in the descrambled data stream. By evaluating the bit-error function section by section, its period length is determined, in which case the section length evaluated at any one time corresponds at least to the simple, predetermined period length. By comparing the predetermined period length to the period length of the section evaluated at any one time, whether the origin of the error lies in the transmission path or in the intermediate path is determined. The sequence of intermediate path and transmission path is inconsequential in this case.

The present invention is based, inter alia, on the realization that bit errors arising in the transmission path occur in the received data stream with a period that is specific to the descrambler and that this period length can be determined from the bit-error function. Thus, one advantage of the process according to the present invention is that the characteristics (periodicity) of the scrambler or descrambler modules usually used is utilized to check the connection existing between the data source and the data receiver. Namely, in conventional scramblers or descramblers, bit errors that occurred before the scrambling operation are characteristically contained as unmultiplied bit errors in the data stream after the descrambling operation, while bit errors that occurred after the scrambling operation, i.e, therefore, on the transmission path, are multiplied by a previously known period. When the period length derived from the bit error functions is compared with the predetermined period length defined by the descrambler instruction, whether the error location lies in the transmission path (in this case, the bit errors occur at least in sections with the descrambler-specific period) or in the intermediate path can be simply determined.

In an advantageous further development of the process according to the present invention for determining the location of an error in a data transmission system, the data stream is made up of data cells. Each data cell has a cell header and a useful cell field. The data cell is transmitted via at least two transmission paths having an intermediate path situated between them. A device for correcting bit errors in the cell head to a data receiver is provided. The test data are written in test cells sent on the side of the data source. The cell heads are then at least checked for bit errors. When it is determined from the comparison of the predetermined period length with the period length of the section evaluated at any one time that the origin of the bit errors lies on one of the transmission paths, and that when it is recognized that at least one bit error is situated in the cell head, the origin of the bit errors is established as lying on the transmission path near that data receiver, and in the case of an error-free cell head, as lying in the transmission path that is distant from the data receiver.

Thus, the process according to the present invention is also particularly suited for applications in so-called wideband ISDN (Integrated Services Digital Network) systems, in which a data exchange among various terminals (for example telephones, fax units) having different data-transmission speeds (bit rates) is rendered possible by means of data streams having a cell-shaped structure. These B-ISDN systems usually employ scramblers or descramblers. In the scramblers or descramblers employed, the bit errors that occurred after the scrambling operation are multiplied by a predetermined period length after the descrambling operation, and the bit errors that occur before the scrambling operation are contained as unmultiplied bit errors in the data stream. So-called switching stations transmit the data stream that has not been scrambled to a subsequent, additional transmission path that is preselected at any one time and thereby check the cell heads in question for bit errors. Depending on the type of bit error that is recognized, either data cells having faulty cell headers are either excluded from a further switching or their cell headers are corrected. Thus, the process according to the present invention, while utilizing the system-specific structure with relatively minimal expenditure, makes it possible to determine whether the origin of bit errors lies in the intermediate path (for example switching exchange) or in a transmission path (and in some instances in which transmission path).

In one advantageous further development of the process according to the present invention, with respect to the requirements for the speed of the subsequent processing processes that evaluate the bit-error function, for classification purposes, the bit-error function is subdivided into classes having a defined class length. The period length is determined from the classified bit-error function.

In one particularly advantageous further development of the process according to the present invention, with respect to the required expenditure and the unambiguous nature of the results, the period length is determined by the autocorrelation of the bit-error function or of the classified bit-error function.

In one advantageous further development of the process according to the present invention, with respect to the unambiguous nature of the results and the length of the section of the bit-error function to be evaluated in each case and, thus, with respect to the processing speed, the period length is determined by the Laplace- or Z-transformation of the bit-error function or of the classified bit-error function.

Furthermore, depending on the position of the clearly defined pole locations in relationship to the j-omega axis in the graphical area of the Laplace- or Z-transformation, the build-up or decay performance of the bit-error function can be assessed by evaluating the Laplace- or Z-transformation.

In one advantageous further development of the process according to the present invention, with respect to the computational work, the period length is determined by the Fourier transformation of the bit-error function or of the classified bit-error function.

Another advantageous further development of the process according to the present invention cross correlates two bit-error functions or classified bit-error functions. This permits checking two bit-error functions for their mutual dependency.

One more advantageous further development of the process according to the present invention uses random numerical sequences in the form of $2^n$-M sequences as test data.

M-sequences are special random numerical sequences. Due to their cross- and auto-correlation functions, which exhibit characteristic maxima, these sequences are particularly well suited for determining the periodicity of the bit-error function and for determining the number of bit errors. The maximum of the cross-correlation function between a $2^n$-M sequence and a corrupted $2^n$-M sequence diminishes, namely clearly as a function of the number of corrupted bits.

$2^n$-M sequences can easily be produced with simple circuit arrangements. These are described, for example, in the book by Tietze/Schenk *Halbleiter Schaltungstechnik (Semiconductor Circuit Technology)*, 1980, pp. 509–512. A detailed mathematical description of m-sequences is found, for example, in *Kodierung zur Fehlerkorrektur und Fehlererkennung (Coding for Error Correction and Error Recognition)* by J. Swoboda, R. Oldenbourg Publishers 1973, pp. 131+132. The application of $2^n$-M sequences as test data for such purposes and the evaluation of test data as such through cross-correlation are described in detail in German Patent Applications 41 10 439.0 and 40 12 850.4.

With regard to the expenditure for computer and circuit engineering for implementing the process according to the present invention, it has proven particularly advantageous to use $2^5$-m sequences.

In one additional, advantageous further development of the process according to the present invention, the test data are inserted into a useful data stream output on the side of the data source, so that useful data can continue to be transmitted in the transmission system during the test. As a result, details about the origin of bit errors can be provided without having to clear the transmission system of operational data streams.

DETAILED DESCRIPTION

Figure 1:
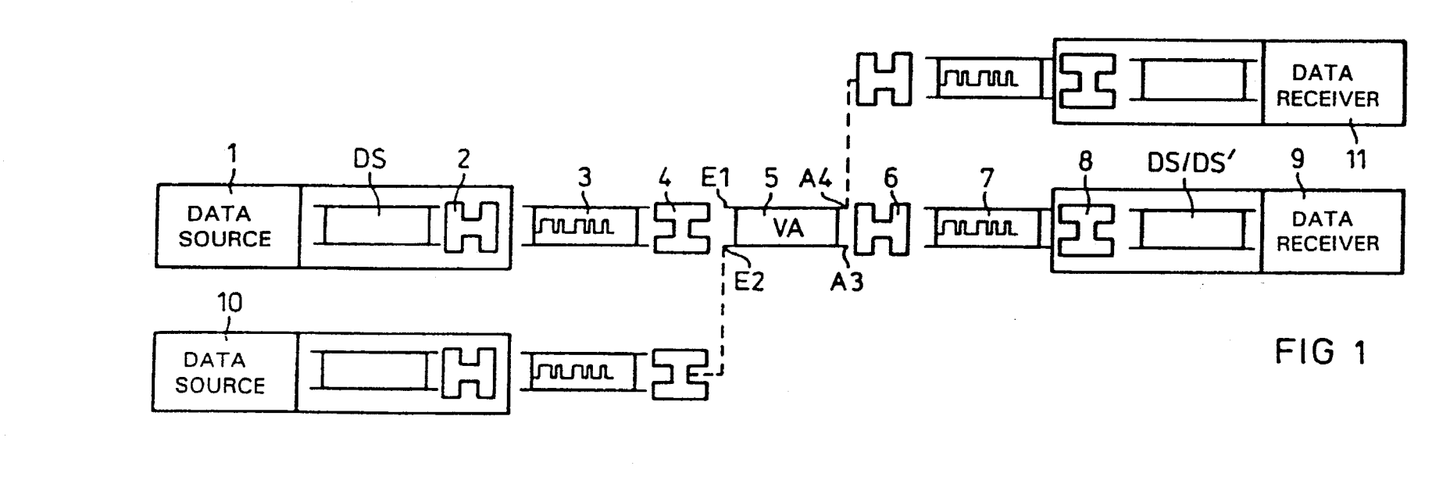
FIG. 1 illustrates a data-transmission system employing the process according to the present invention.

FIG. 1 depicts a system for transmitting digital data streams. The transmission system includes a data source 1, a scrambler 2, a first transmission path 3, a descrambler 4, an intermediate path 5, a scrambler 6, an additional transmission path 7, and a descrambler 8. The data descrambled by the descrambler 8 arrives at a data receiver 9. The intermediate path 5 is designed as a switching station VA that is clarified in greater detail in the following with reference to FIG. 3. The data source 1 and the data receiver 9 are interconnected for exchanging data via the switching station VA and the transmission lines 3 and 7. The switching station VA could, in the same way (as indicated by a dotted line in FIG. 1) establish a connection between an additional data source 10 and the data receiver 9 or also with an additional data receiver 11.

In the following, it is assumed that the switching station VA has established a connection (in the following called "channel-1") between the data source 1 and the data receiver 9 for transmitting a data stream DS between them. In such a case, the channel-1 is supposed to be checked in the following for origins of bit errors. Interference effects acting on the data stream DS being transmitted through the transmission lines 3 and 7 or through the intermediate path 5 (VA) corrupt the binary data (in the following called "bit errors") at individual locations on the data stream DS. As a result, the data receiver 9 receives a faulty data stream DS'. The following description is based on an ideal data source 1 and an ideal data receiver 9, so that, corresponding largely to real conditions, errors caused by them can be ignored.

Figure 2:
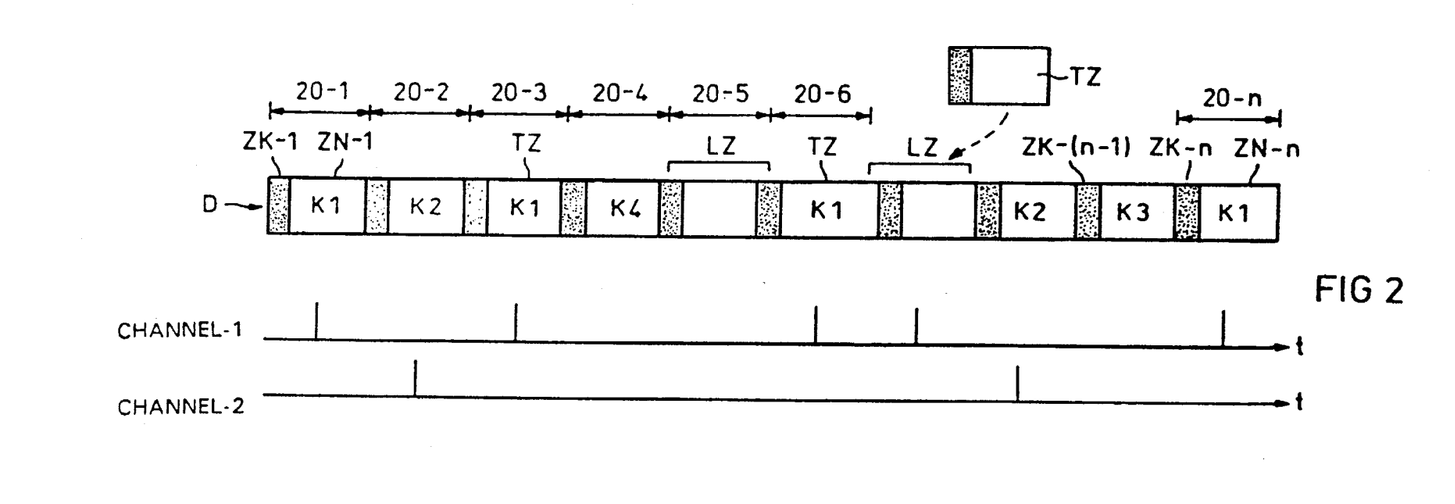
FIG. 2 illustrates the composition of a data stream in the transmission system of the present invention.

FIG. 2 depicts the composition of a data stream D which flows in the system being checked via the switching exchange VA (FIG. 1). The data stream D consists of a plurality of data cells 20-1 through 20-n. Each data cell includes a cell header ZK-1 through ZK-n which contain addressing and control data and of a useful cell field ZN-1 through ZN-n. In addition to the data cells K1 sent out by the data source 1 and determined for the data receiver 9 (FIG. 1), the data stream D contains additional data cells K2, K3 and K4. The additional data cells come from other data sources or are intended for other data receivers. The appearance of data cells K1 and other data cells K2 intended for the data receiver 9 and sent out by the data source 1 is indicated as a function of time in FIG. 2 below the data stream D. The switching exchange VA (FIG. 1) switches through the data cells K1 from the data source 1 to the data receiver 9 via channel-1, so that the data cells K1 make up the data stream DS depicted in FIG. 1. The data streams D and DS contain blank cells LZ, which are provided for synchronizing the transmission rates of the individual subscribers (data source/data receiver), since the transmission system is not utilized 100%. Such blank cells LZ can be replaced by test cells TZ in the form of data from the data source 1 that are stimulated in a defined manner. The data content of the test cells TZ is designed to enable bit errors to be clearly detected. This measuring configuration is described as a "transparent cut-through mode". Thus, in this mode, the test cells are integrated in a stream of useful cells, so that the channel-1 to be tested does not have to be cleared.

In another standard measuring configuration, the channel to be tested is isolated from the remaining data flow, and the transmission device on the channel to be tested is only stimulated with test cells and blank cells.

Figure 3:
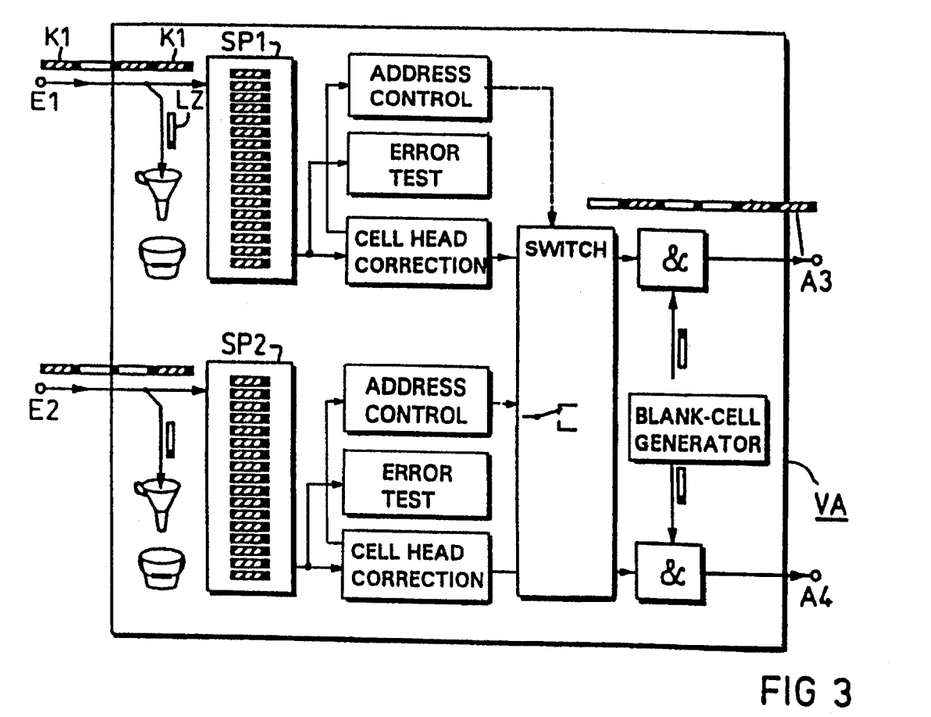
FIG. 3 is a schematic which illustrates a switching exchange of the transmission system of the present invention.

FIG. 3 illustrates, in detail, the structure of the switching exchange VA. The data cells K1 (hatched in the drawing) coming from the data source 1 and mixed with blank cells LZ are applied to an input E1. The blank cells LZ are removed from the data stream to reduce the capacity required of a subsequent storage device SP1. The remaining data cells (shown cross-hatched in FIG. 3) are written into the storage device SP1 until further processing takes place. By temporarily storing the data-cell stream in the storage device SP1 and by inserting blank cells after the read-out, phase differences and bit-rate differences between the inputs and outputs of the switching exchange VA can be tolerated within certain limits. The data cells are sequentially read out of the storage device SP1, for further processing. When being read out, their cell heads are checked for errors and, if necessary, corrected. This check test can be performed, for example, based on a check word contained in the cell head and derived from the content of the cell head (for example, from the first four bytes of the cell head). Such an evaluation and correction of the cell head is described, for example, in the CCITT (*Comité Consultatif International de Télégraphique et Téléphonique*)-Correction 1990, pp. 134–137. Data cells having a cell head which contains errors, that can not be corrected are excluded from the further exchange. In this manner, only data cells having error-free cell heads are provided at the output A3 of the switching exchange VA. The switch shown indicatively in FIG. 3 symbolizes the possibility of connecting the input E1 or an input E2, for example, to an output A4 for a further data receiver 11 (FIG. 1).

Figure 4:
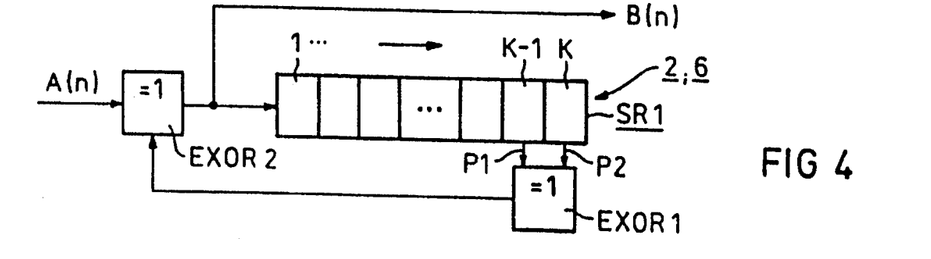
FIG. 4 is a schematic which illustrates the structure of a scrambler.

FIG. 4 depicts, in detail, a simplified variant of the scrambler 2 or 6 of FIG. 1. The scrambler 2,6 includes a shift register SR1 having k registers. The outputs of the registers (k−1) and k lead, as feedback points P1 and P2, to the inputs of an exclusive OR-gate EXOR1. The output of EXOR1 leads to an input of a second exclusive OR-gate EXOR2. An additional input of the second exclusive OR-gate EXOR2 receives a data stream of individual bits A(n). The output of the second exclusive OR-gate EXOR2 is provided as an input to the first register of the shift register SR1 and, at the same time, forms the output of the scrambler 2,6, from where a scrambled sequence B(n) is adapted to be tapped off. Thus, the scrambler 2,6 scrambles the binary data being applied on the input side in an input sequence A(n) according to a specified instruction, the period of the instruction being defined by the feedback points P1 and P2.

Figure 5:
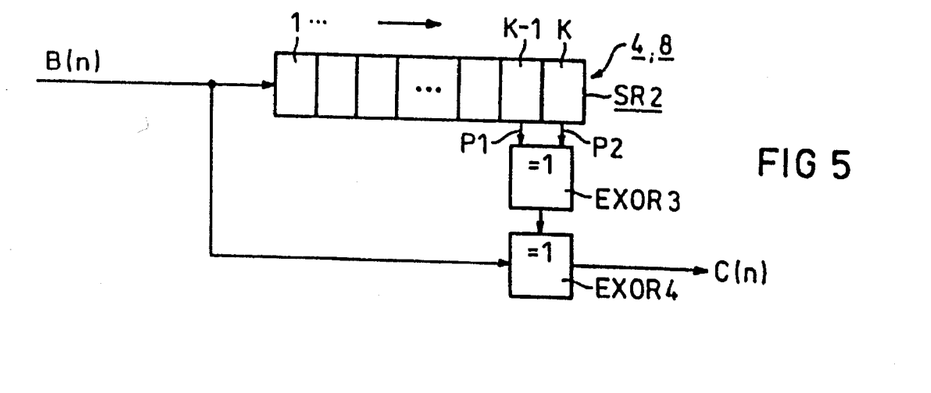
FIG. 5 is a schematic which illustrates the structure of a descrambler.

FIG. 5 depicts the descrambler 4 (or 8) (simplified variant) of FIG. 1, which receives a scrambled sequence of binary data B(n) at its input side. The descrambler 4 includes a shift register SR2 likewise having k register. The outputs of the registers (k−1) and k are provided as inputs to k an exclusive OR-gate EXOR3 in a manner similar to that described above with reference to FIG. 4. The output of the exclusive OR-gate EXOR3 is provided as an input to a second exclusive OR-gate EXOR4. The second exclusive OR- gate EXOR4 also receives the scrambled data sequence B(n) at its input. The descrambled data sequence C(n), which in the case of an error-free transmission corresponds to the input sequence A(n) in accordance with FIG. 4, is adapted to be tapped off at the output of the second exclusive OR-gate EXOR4. Thus, the descrambler 4 carries out the descrambling operation in accordance with an instruction, which corresponds to that of the scrambler according to FIG. 4. This is shown by the selection of the same registers (k−1) and k as feedback points P1 and P2.

In the scrambler shown in FIG. 4, an individual bit error contained in the input-data sequence A(n) occurs as a multiplied bit error in the output-data sequence B(n) and, in fact, with a period (i.e., in a spacing rated in a number of bits) that is defined by the period of the scrambler, i.e., by the position of the feedback points P1 and P2, and thus is predetermined. How often an individual bit error being applied on the input side is multiplied is likewise predetermined. In the present example according to FIG. 4, the period is k+1 bits long. An individual bit error being applied on the input side would appear three times in the output-side data sequence B(n). The bit error being applied on the input side appears a first time directly during the writing into register 1, because the output-data sequence B(n) is tapped off at the same time at the output of the second exclusive OR-gate EXOR2. The individual bit error is again fed back through the two feedback points P1 and P2 upon reaching the registers (k−1) or k, and written into the output-data sequence B(n), provided that the bit error is not canceled by chance by the input-side exclusive OR-operation. However, this only occurs in a statistically negligible number of cases, so that an individual bit error being applied on the input side appears with a high statistical probability as an appropriately multiplied bit error in the output signal B(n).

The same applies essentially to the descrambler 4 shown in FIG. 5. Based on the corresponding instruction (feedback points P1, P2), the descrambler 4 causes an individual bit error being applied to the scrambler 2 on the input side (in accordance with FIG. 4) to also appear only individually again in the output signal C(n) from the descrambler according to FIG. 5. The periodic multiplication described in conjunction with FIG. 4 is consequently compensated. An individual bit error being applied on the input side (i.e., in the signal B(n)) is multiplied (in this example trebled) in accordance with the principles described above and, accordingly, appears often in accordance with the polynomial that is characteristic of the instruction, and with its period length in the output-data sequence C(n) of the descrambler 4. This polynomial can be generally formulated as: $x^k + x^{k-1} + \ldots + x^1 + 1$, the bit field being multiplied in accordance with the feedback points, so that a multiplied bit error is characterized by a bit-error sequence in the relative spacings k, (k−1) and 1.

The application of the process for determining the origin of bit errors will now be described based on an example of a data stream having a cell-shaped structure, the process also being applicable in principle to data streams that do not have a cell structure.

Figure 6:
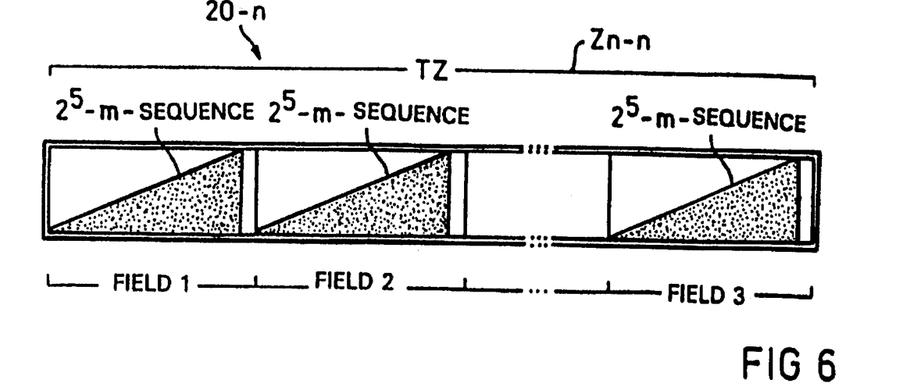
FIG. 6 is a detailed illustration of a useful cell field.

FIG. 6 depicts a useful cell field Zn-n of a data cell 20-n in accordance with FIG. 2 in a detailed representation. The useful cell field Zn-n includes 12 individual fields, each individual field having a 32-bit length, so that the entire useful cell field contains 384 bits (48 bytes). The data cell is designed as a test cell TZ, each individual field containing a $2^5$-M sequence. M-sequences are special random numerical sequences. A general description of these sequences and how they are produced can be found, for example, in *Algebraische Modelle autonomer, rüiickgekoppelter Schieberegister und Analyse der Zwei-Wege-Rückkopplung* (Algebraic Models of Autonomous Feedback Shift Registers and Analysis of Bidirectional Feedback) by R. Gebhardt, Dissertation, Electronic Engineering Faculty, TU Aachen, 1983.

Such test cells are inserted by the data source 1 (FIG. 1) into the data stream DS, in place of the blank cells LZ (or when the system is cleared, sent mixed exclusively with blank cells). Each field received in the data receiver 9 with a $2^5$-m sequence undergoes a cross-correlation with the predetermined setpoint $2^5$-m-sequence.

Figure 7:
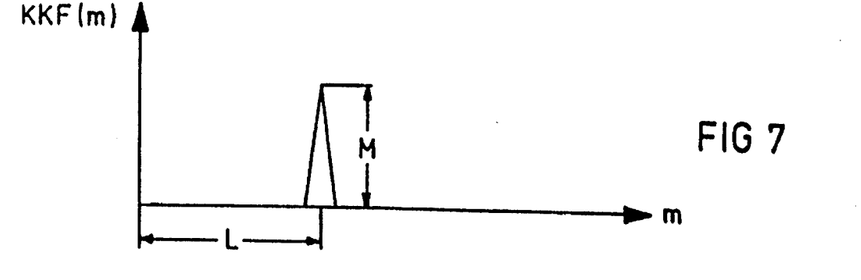
FIG. 7 illustrates a cross-correlation function of a test-data sequence.

FIG. 7 schematically depicts the result of such a cross-correlation as a function KKF(m). The position L of the maximum determines the value of the field, and the level M of the maximum determines the similarity to the setpoint m-sequence. The German Patent Application 40 12 850.4 describes in detail such a determination and evaluation of test cells in a data stream. In the present example, the unambiguous nature of the maximum enables up to seven bit errors per field, i.e., up to 84 bit errors per data cell, to be accepted.

Figure 8:
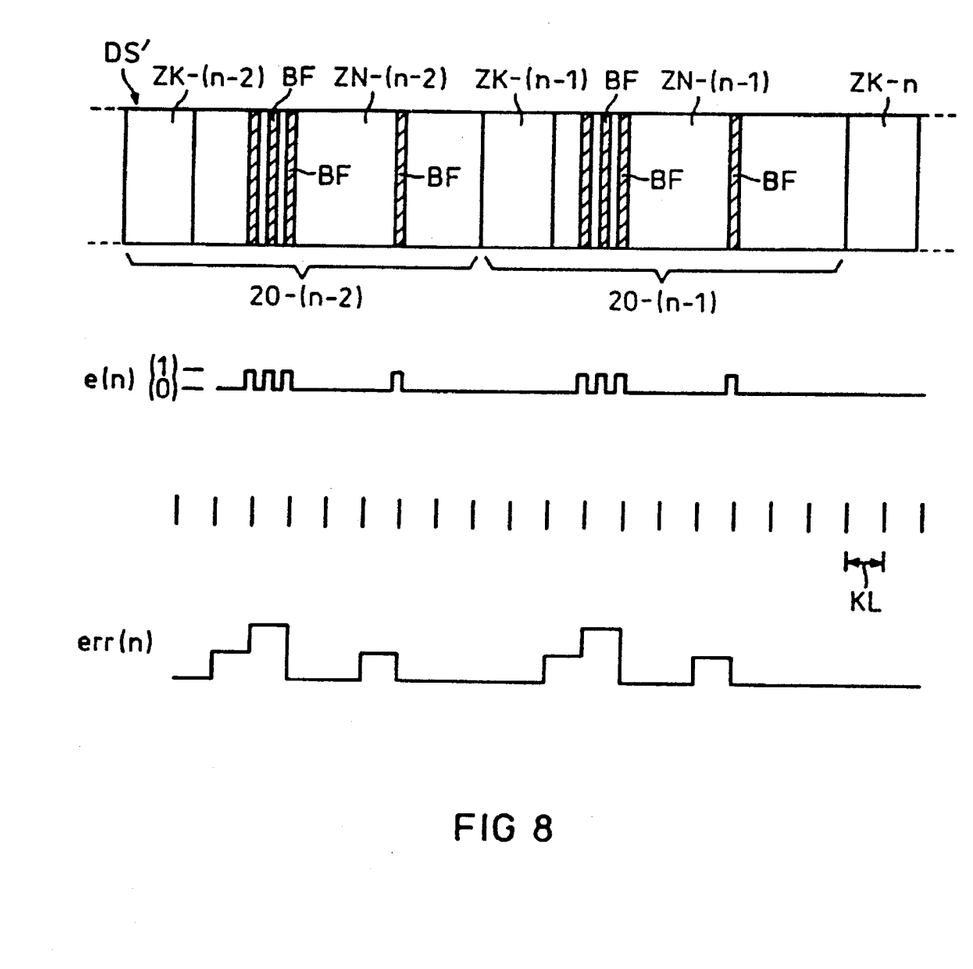
FIG. 8 illustrates an evaluation of a faulty data stream.

FIG. 8 illustrates the data stream DS of FIG. 1 that is afflicted with a few bit errors BF and therefore designated as DS'. In the data cells 20-(n−2) and 20-(n−1), designed in each case as test cells TZ, four bit errors BF are detected at a time through a comparison with the respective source-test cells. By assigning a zero (0) to a correctly transmitted bit and a one (1) to an incorrectly transmitted bit, a bivalent, unipolar bit-error function e(n) is acquired, which is shown in the second line of FIG. 8. If the bit-error function e(n) is factored into individual classes having the class interval KL depicted in the third line of FIG. 8, a classified bit-error function err(n) results, whose time characteristic is shown in the fourth line of FIG. 8. The bit errors appearing in each case during one class interval KL are summed, and the sum is maintained until the beginning of the following class interval KL. The classification allows that data set which is to be processed to be considerably reduced in comparison with the bit-error function e(n), so that the degree of complexity and speed required of the subsequent processes are diminished.

The level M of the maximum of the cross-correlation function KKF(m) of the $2^5$-M-sequence having a corresponding setpoint sequence and contained in one field of a test cell TZ, as depicted in FIG. 7, is a measure for the number of bit errors contained in this field. In this manner, a classified bit-error function err(n) is already obtained quite advantageously with a class interval of 32 bits in each case (specific individual field width).

For the sake of simplicity, in the subsequent example, it is assumed that one single bit error has appeared in the data stream DS.

In addition, it is assumed that the single bit error has occurred in the scrambled cell stream, i.e., for example on the transmission path 7 (FIG. 1). It is assumed that this bit error has released the classified error function err(n), which is depicted in the fourth line in FIG. 8 and which releases the form err(n)= (0,1,2,0,0,1,0,0,0,0,1,2,0,0,1,0,0,0), written numerically, in the descrambled data stream DS. As is already discernible from the bit-error function e(n), a single bit error releases eight bit errors BF with a periodicity (bit length) of 9 in the data stream DS' being received, i.e., a single bit error is multiplied eight times by the scrambler. The scrambler (and thus also the descrambler) is, therefore, more complex with eight feedback points in this example than the one operated in FIG. 4. The classified bit-error function err(n) subsequently undergoes an autocorrelation.

Figure 9:
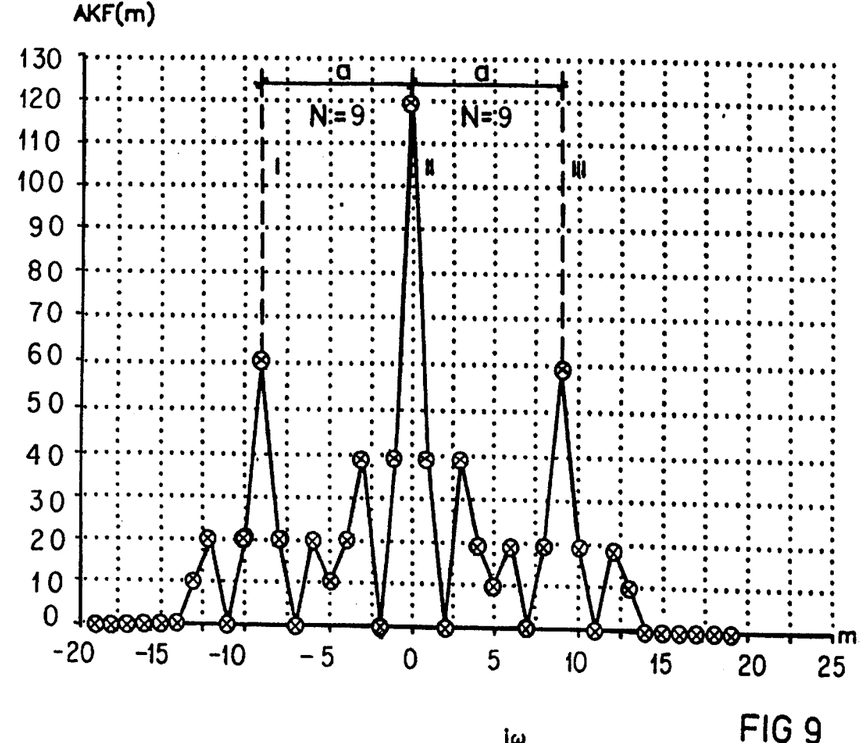
FIG. 9 illustrates a discrete autocorrelation function of a bit-error function.

FIG. 9 shows the discrete autocorrelation function AKF (m) of the classified bit-error function err(n) and gives significant details about the period length of the bit-error function e(n). The variable m describes the relative (bit) spacing of the correlated function. The autocorrelation function AKF(m) exhibits a main maximum at m=0 and symmetrical secondary maxima at m=−9, or rather m=9. The amount of spacings a from the secondary maxima to the main maximum is a measure for the period length N of the bit-error function e(n). In the present case, N=9.

Another possibility for determining the period length of the error function e(n) is to evaluate the Laplace transform. The bit-error function e(n) can be approximated through exponential functions and, consequently, allows the Laplace transform to be determined in a numerically simple manner.

Figure 10:
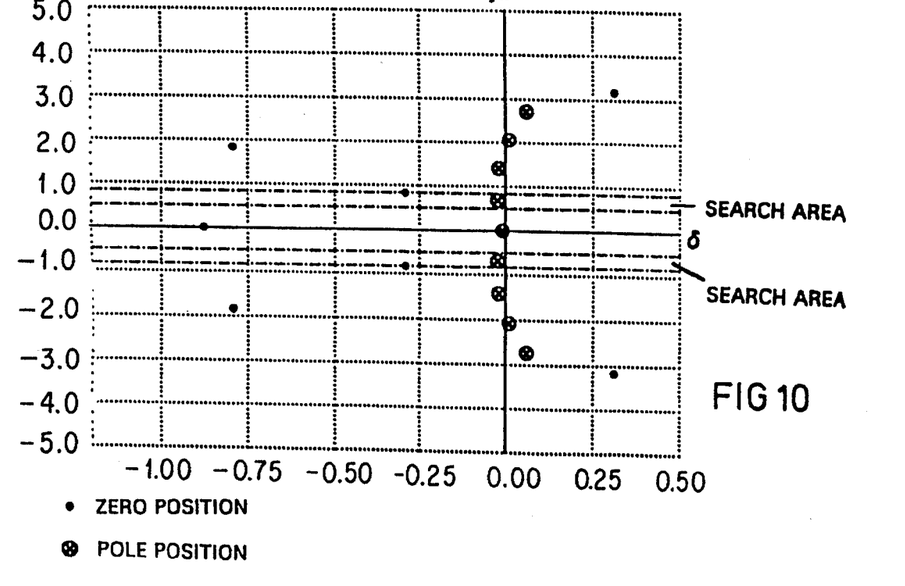
FIG. 10 illustrates the Laplace transform of the bit-error function.

FIG. 10 depicts that exclusively pole and zero positions occur in the graphical area of the Laplace transformation.

The Laplace transform is evaluated in the graphical area within a frequency band that can be understood as a search area and whose position is specified by the equation $$\omega_{1,2} = \pm 2 \frac{\pi}{N_v}$$

In this case, $N_v$ signifies the period length that is known based on the instruction for the scrambler or descrambler.

In the present example, the search areas lie with $N_v=9$ at $\omega_1=-0.7$ and $\omega_2=0.7$. If pole positions are present in this area, then the bit-error function e(n) has spectral components in this frequency range, which are characteristic of bit errors that have influenced the scrambled data stream.

Since the Z-transformation is the Laplace transformation with the transformed graphical area, which Laplace transformation has been made discrete (compare, for example, D. Kreß/R. Irmer *Angewandte Systemtheorie* (Applied System Theory), R. Oldenbourg Publishers, Munich, Vienna 1990), it produces the same results for determining the period length of the bit-error function e(n).

Figure 11:
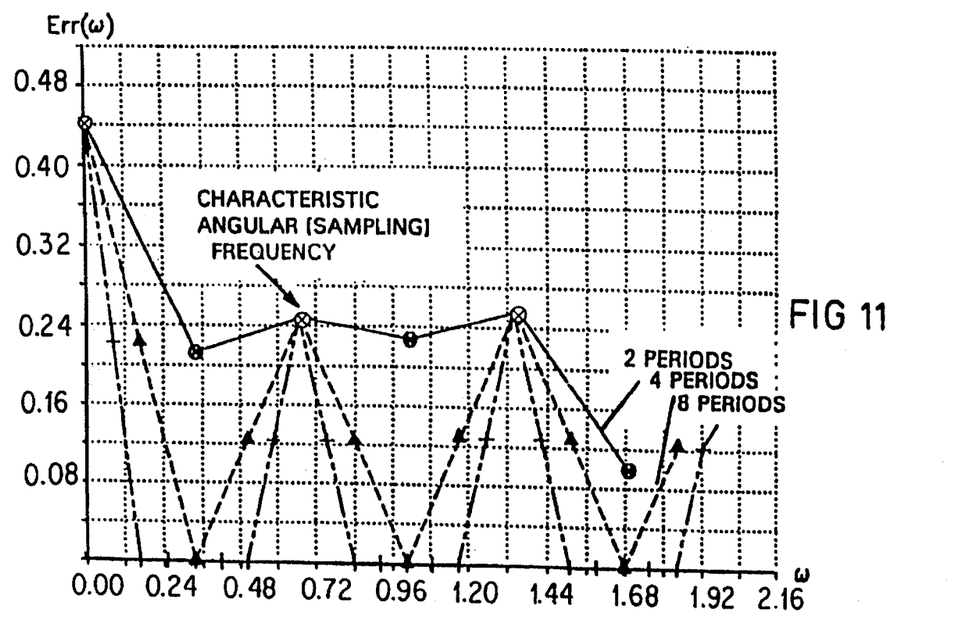
FIG. 11 illustrates the discrete Fourrier transform of the bit-error function.

Another possibility for determining the period length N of the bit-error function e(n) is the Fourier transformation. FIG. 11 illustrates the results of a discrete Fourier transformation ERR ($\omega$), which is considered as a special case for the Laplace transformation (viewing the j$\omega$-axis) (compare Otto Föllinger, *Laplace und Fouriertransformation*, 5th edition, 1990, pp. 184 ff). For this, the classified bit-error function err(n) was sampled four times. FIG. 11 shows that the characteristic angular sampling frequency $\omega=0.7$ and, thus, the period length $N=2\pi/\omega$ is only significant starting from four checked periods of the classified error function err(n)—i.e., starting from two individual errors in the scrambled data stream. Therefore, the Fourier transformation, in particular, would provide a solution when periodically appearing bit errors are assumed.

Figure 12:
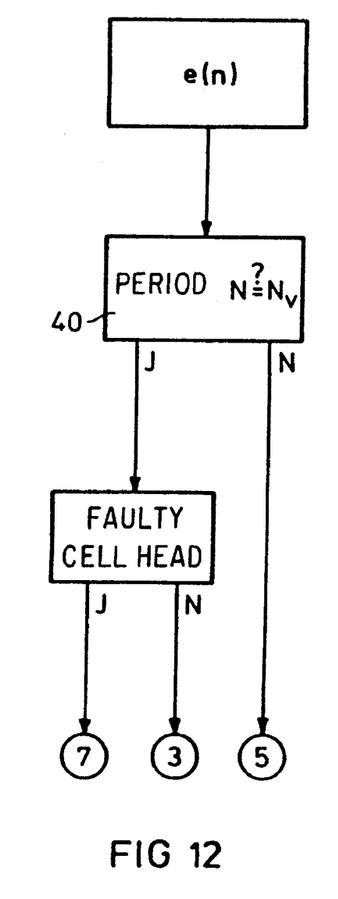
FIG. 12 is a schematic which illustrates the determination of the origin from the evaluated bit-error function in accordance with the process of the invention.

After, as clarified above, the period length N of the bit-error function e(n) is determined with at least one of the processes, it can be determined in accordance with FIG. 12, through a simple comparison 40 of this period length N with the previously known period length $N_v$, whether the origin of the error lies in the intermediate path or in a transmission path. If, namely, the relation $N \neq N_v$ applies (frequent, non-periodic appearance of individual bit errors), then the origin is to be searched for in the intermediate path 5. An error that has occurred in the intermediate path 5 is initially multiplied by the scrambler 6 (FIG. 1). This multiplication is subsequently revoked by the descrambler 8 as described in detail in conjunction with FIGS. 4 and 5.

If the relationship $N=N_v$ applies, then given a single transmission path, for example only the transmission path 7 (FIG. 1), the error location is likewise entirely determined. However, if the intermediate path 5 is embedded between two transmission paths 3,7, it must be subsequently tested whether the cell head of the test cells TZ forming the error function e(n) in question is likewise faulty. This can be simply accomplished by means of the error test in the cell head clarified in detail in conjunction with FIG. 3. Since statistically, it can be assumed that the cell head and the useful cell field are equally exposed to interference effects, a fault cell head determines that the origin lies in the transmission path 7 (FIG. 1) downstream from the intermediate path and next to the data receiver. As clarified in detail in conjunction with FIG. 3, the switching station VA (intermediate path 5), namely, only outputs data cells having a correct cell head at their outputs, so that a faulty cell head indicates effects from errors along the transmission line 7. If, on the other hand, the cell head is error-free, then the error location must be searched for in the transmission path 3, because the interference effects, which may have originally changed the cell head and the useful cell field, are only still manifested in a faulty useful field. This is a point in favor of running through the intermediate path 5 already in the faulty state of the useful field.

We claim:

1. In a system having a data source, providing a data stream, at least one intermediate transmission path, providing a transmission path for the data stream, a scrambler, scrambling the data stream in accordance with a specified instruction of a predetermined period length, at least one transmission path, providing a transmission path for the scrambled data stream, and a descrambler, descrambling the scrambled data stream in accordance with an instruction corresponding to the specified instruction of a predetermined period length, a method for determining the origin of bit errors in the descrambled data stream comprising steps of:

a) injecting test data into the data stream;

b) evaluating bit errors contained in the descrambled data stream;

c) deriving a bit error function from received test data based on the evaluation of bit errors of step (b);

d) evaluating the bit error function section by section, based on the predetermined period length;

e) determining a period length of the bit error function based on the section by section evaluation of the bit error function of step (d);

f) comparing the period length of the bit error function determined in step (e) with the predetermined period length;

g) determining the origin of the error to lie in the transmission path if the period length of the bit error function determined is equal to the predetermined period length and determining the origin of the error to lie in the intermediate transmission path if the period length of the bit error function determined is not equal to the predetermined period length.

2. The process of claim 1 further comprising the steps of:

subdividing the bit error function into classes having a defined class length; and determining the period length of the bit error function from the classified bit error function.

3. The process of claim 1 wherein the step of determining the period length of the bit error function includes a step of autocorrelating the bit error function.

4. The process of claim 1 wherein the step of determining the period length of the bit error function includes a step of determining the Laplace transform of the bit error function.

5. The process of claim 1 wherein the step of determining the period length of the bit error function includes a step of determining the Z-transform of the bit error function.

6. The process of claim 1 wherein the step of determining the period length of the bit error function includes a step of determining the Fourier transform of the bit error function.

7. The process of claim 1 wherein the step of determining the period length of the bit error function includes a step of cross-correlating two bit error functions.

8. The process of claim 1 wherein the test data is injected on the side of the data source.

9. The process of claim 1 wherein the test data comprises random numerical sequences.

10. The process of claim 9 wherein the random numerical sequences are $2^n$-M sequences.

11. The process of claim 9 wherein the random numerical sequences are $2^5$-M sequences.

12. In a system having a data source, providing a data stream, the data stream including a plurality of data cells, each of the data cells having a cell head and a useful field, at least one intermediate transmission path, providing a transmission path for the data stream, and having a device for correcting bit errors in the cell head, a scrambler, scrambling the data stream in accordance with a specified instruction of a predetermined period length, a first transmission path lying adjacent to a receiver and a second transmission path lying distant from the receiver, each transmission path providing a transmission path for the scrambled data stream, and a descrambler, descrambling the scrambled data stream in accordance with an instruction corresponding to the specified instruction of a predetermined period length, a method for determining the origin of bit errors in the descrambled data stream comprising steps of:

a) injecting test data into test cells;

b) checking the cell heads for bit errors;

c) evaluating bit errors contained in the descrambled data stream;

d) deriving a bit error function from received test data based on the evaluation of bit errors of step (c);

e) evaluating the bit error function section by section, based on the predetermined period length;

f) determining a period length of the bit error function based on the section by section evaluation of the bit error function of step (e);

g) comparing the period length of the bit error function determined in step (f) with the predetermined period length;

h) determining the origin of the error to lie in the first transmission path if the period length of the bit error function determined is equal to the predetermined period length and if an error is detected in the cell head, determining the origin of the error to lie in the second transmission path if the period length of the bit error function determined is equal to the predetermined period length and an error is not detected in the cell head, and determining the origin of the error to lie in the intermediate transmission path if the period length of the bit error function determined is not equal to the predetermined period length.

13. The process of claim 12 further comprising the steps of:

subdividing the bit error function into classes having a defined class length; and determining the period length of the bit error function from the classified bit error function.

14. The process of claim 12 wherein the step of determining the period length of the bit error function includes a step of autocorrelating the bit error function.

15. The process of claim 12 wherein the step of determining the period length of the bit error function includes a step of determining the Laplace transform of the bit error function.

16. The process of claim 12 wherein the step of determining the period length of the bit error function includes a step of determining the Z-transform of the bit error function.

17. The process of claim 12 wherein the step of determining the period length of the bit error function includes a step of determining the Fourier transform of the bit error function.

18. The process of claim 12 wherein the test data is injected on the side of the data source.

19. The process of claim 12 wherein the step of determining the period length of the bit error function includes a step of cross-correlating two bit error functions.

20. The process of claim 12 wherein the test data comprises random numerical sequences.

21. The process of claim 20 wherein the random numerical sequences are $2^n$-M sequences.

22. The process of claim 20 wherein the random numerical sequences are $2^5$-M sequences.

* * * * *